United States Patent [19]

Spring et al.

[11] Patent Number: 5,589,631
[45] Date of Patent: Dec. 31, 1996

[54] LEAK DETECTION WITH NON-TOXIC LIQUIDS

[75] Inventors: G. Everett Spring, Makawao, Hi.; Douglas V. Keller, Jr., Lafayette, N.Y.

[73] Assignee: Spring Patents Corporation, Makawao, Hi.

[21] Appl. No.: 281,854

[22] Filed: Jul. 26, 1994

Related U.S. Application Data

[63] Continuation of Ser. No. 922,622, Jul. 30, 1992, abandoned, which is a continuation-in-part of Ser. No. 530,613, Jul. 9, 1990, Pat. No. 5,184,504, and a continuation-in-part of Ser. No. 673,772, Mar. 21, 1991, abandoned.

[51] Int. Cl.$^6$ ................................................. G01M 3/32
[52] U.S. Cl. .................... 73/49.2; 220/426; 252/964
[58] Field of Search ........................ 73/40, 49.2, 49.3; 220/415, 426, 428, 469, 565; 252/964

[56] References Cited

U.S. PATENT DOCUMENTS

| | | | |
|---|---|---|---|
| 1,886,074 | 11/1932 | Wortmann | 220/426 |
| 1,954,581 | 3/1934 | Wortmann | 220/426 |
| 4,561,292 | 12/1985 | Pugnale et al. | 220/426 |
| 4,653,312 | 3/1987 | Sharp | 73/49.2 |
| 4,685,327 | 8/1987 | Sharp | 73/49.2 |
| 4,708,015 | 11/1987 | Sharp | 73/49.2 |
| 4,796,469 | 1/1989 | Brown et al. | 73/49.2 |
| 4,936,705 | 6/1990 | Schneider | 73/49.2 |

*Primary Examiner*—Michael Brock
*Attorney, Agent, or Firm*—Hughes, Multer & Schacht, P.S.

[57] ABSTRACT

Systems for fluids (including liquids) and materials with a fluid phase. The material is confined in a primary containment, and a secondary containment is used to keep fluid leaking from the primary containment from the surrounding environs and to keep leachates and other fluids from the primary containment. A safe, non-toxic liquid in the interspace between the two containments is employed in detecting leaks in the containments and can also be employed to protect the containments against chemical attack.

4 Claims, 7 Drawing Sheets

LEAK DETECTION WITH NON-TOXIC LIQUIDS

RELATION TO OTHER APPLICATIONS

This is a continuation of application Ser. No. 07/922,622 filed on 30 Jul. 1992, now abandoned, which is a continuation-in-part of application Ser. No. 530,613, U.S. Pat. No. 5,194,504, filed 9 July 1990 by G. Everett Spring for LEAK DETECTION, a continuation-in-part of application Ser. No. 673,772, now abandoned, filed 21 Mar. 1991 by G. Everett Spring for LEAK PREVENTION.

TECHNICAL FIELD OF THE INVENTION

The present invention relates to novel, improved methods and apparatus for detecting the leakage of fluids (including liquids) from a variety of containment vessels including tanks and lines and for detecting leakage into systems isolating such vessels from the surrounding environs.

More particularly, the present invention relates to methods and apparatus as characterized in the preceding paragraph in which a change in a characteristic of, or associatable with, a nontoxic liquid is employed as an indicator of a possible leak in a primary or secondary containment bounding a body of the leak detecting liquid.

BACKGROUND OF THE INVENTION

The release of environmental contaminants from underground storage tanks and associated devices such as piping, fittings, flanges, valves, and pumps by leakage, spills, overfilling, etc. is a serious, pervasive source of environmental pollution and a problem which has been taken up by numerous regulatory agencies.

In the United States, for example, a number of rules and regulations addressing this problem have been promulgated by the Environmental Protection Agency (EPA). Among other things, the EPA standards require that regulated tanks and piping be monitored for the leakage or other release of hazardous substances. This regulation can be complied with by employing a leak detection and monitoring system having the following minimum capabilities for tightness testing of tanks and piping:

Leak Detection Rate 0.10 gallon per hour

Probability of Detection ≧95 percent

Probability of a False Alarm ≦5 percent

Aside from the environmental pollution that results, leaks from containment vessels are undesirable because of the safety hazards and consequent liability the leaked substance may present and/or because of economic factors. For example, as the cost of crude oil increases, the economic penalties appurtenant to leaks of the oil and products refined from it become increasingly severe. Such considerations have led the American Petroleum Institute to recommend a leak detection threshold rate of 0.05 gallons per hours.

A comparable problem exists in aboveground storage systems. Leaks from aboveground tanks, pipes, and other containment vessels cause significant contamination of soil, air, surface water, etc. in the surrounding environment. And, again, no satisfactory system for monitoring such systems and detecting leaks with a satisfactory level of accuracy has been found to currently be available.

It is nowadays a widespread if not universal practice—at least in new construction—to store fluids and materials with a fluid phase in a system which has a primary containment for the stored material and a secondary containment enveloping or jacketing the primary containment. The secondary containment keeps stored materials from reaching the surrounding environs if there is a leak in the primary containment or such a leak develops. Also, the secondary containment keeps fluid in the surrounding environs from passing through such a leak and contaminating material stored in the primary containment.

For the same reasons, it is currently a common practice to jacket other fluid handling devices—pipes, valves, flanges, pumps, etc.

U.S. Pat. No. : 4,676,093 issued 30 Jun. 1987 to Pugnale et al. for DOUBLE-WALL UNDERGROUND TANK; U.S. Pat. No. 4,561,292 issued 31 Dec. 1985 to Pugnale et al. for DOUBLE-WALLED UNDERGROUND CONTAINER FOR STORING LIQUIDS AND LEAK DETECTING MEANS THEREFORE; and U.S. Pat. No. 4,936,705 issued 26 Jun. 1990 to Schneider for RESERVOIR for UNDERGROUND TANKS disclose leak detection systems for storage units of the character described in the preceding paragraph. In these patented systems, the space between primary and secondary containments is filled with a leak detecting liquid; and a drop in the level of this liquid is taken as evidence that a leak has occurred in the primary containment or in the secondary containment or that leaks have developed in both containments.

The only leak detecting fluid identified in the preceding patents is one "anti-freeze solution" of unspecified character and therefore presumably a conventional water-based one.

The use of antifreeze solutions and other aqueous leak detecting liquids is undesirable because of the corrosion they may cause by metal solubilization and/or by enabling electrochemical reactions and because compounds employed as antifreezes such as glycols and salts are, at least in some cases, toxic and/or capable of damaging the environment.

Furthermore, merely employing a selected magnitude drop in the level of the detecting liquid—which is all that the patents disclose—may allow serious leaks to go undetected. Leaks into a buried system from the surrounding environs, for example, may actually cause the level of the leak detecting fluid in the system to rise.

SUMMARY OF THE INVENTION

It has now been found that the problems associated with the use of brines and other antifreeze solutions as leak detecting liquids can be alleviated, if not entirely eliminated, by replacing these liquids with certain "safe" vegetable, mineral, and marine oils. The useful oils are nontoxic and do not cause corrosion. Viscosities are low enough for the oils to flow freely over an acceptable range of temperatures. And useful oils are widely available in quantity at modest cost.

Stability can be ensured, if necessary, by employing conventional antioxidants and other additives. Furthermore, the cost of useful oils is low enough that it is practical to replace them if they do oxidize or otherwise degenerate to the point where they become too viscous or are otherwise no longer capable of performing in an acceptable fashion.

Systems in which nontoxic oils can be employed as leak detection liquids in accord with the principles of the present invention include those with rigid primary and secondary containments—for example, double walled steel tanks. They can also be employed in systems which have a rigid containment with a flexible inner liner or overwrap and in systems where both the primary and secondary containments are fabricated from flexible materials.

Detection of a possible leak can be accomplished in different ways. One which is simple but effective is to employ a change in the level of the leak detecting liquid as an indication of a possible leak of fluid from the primary containment into the space between that containment and the secondary containment or, in the case of a buried system, leakage of a leachate or other harmful fluid from the surrounding environs into the containment interspace. Statistical techniques such as regression analysis can be employed in this direct, volumetric approach to identify those leaks which are significant.

In this leak detection technique, it is the level of the leak detecting liquid in a reservoir or standpipe communicating with the containment interspace that is preferably monitored because level changes are more easily observed in these smaller volume adjuncts. Furthermore, this approach makes it possible to monitor level changes at an aboveground or other convenient location in those applications of the invention involving a buried or other relatively inaccessible containment system.

It is of course not essential that this reservoir or standpipe approach be employed. In an aboveground system, for example, a sight glass or comparable device can be used to directly monitor the level of the leak detecting liquid in the intercontainment space.

An alternative to direct monitoring is to maintain a vacuum in the primary/secondary containment interspace and monitor the pressure in this space. Increases in the effort required to maintain the vacuum at a selected level are used as indications of possible leaks.

Yet another alternative is to circulate the leak detection liquid through the primary/secondary containment interspace, then remove the liquid and analyze it for the presence of foreign substances. If these are found and they correspond in character to the fluid held in the primary containment (or substances in the surrounding environs), it is likely that a leak exists.

From the foregoing, it will be apparent to the reader that one important and primary object of the present invention resides in the provision of novel, improved methods and systems for detecting possible leaks in the containments of fluid storage systems.

Other important objects, as well as additional advantages and features of the invention, will be apparent from the foregoing and the appended claims and as the ensuing detailed description and discussion proceeds in conjunction with the accompanying drawings.

DETAILED DESCRIPTION OF THE INVENTION

As discussed above, the present invention is concerned with fluid storage systems in which a safe liquid—a mineral, marine, or vegetable oil—in a space between primary and secondary fluid containments is monitored in a manner which identifies changes indicative of possible leaks in the containments.

Of the available marine oils, menhaden oil and sardine oil are considered suitable. These oils are nontoxic and have a viscosity of not more than 100 centistokes over the −25° to 140° F. temperature range in which the fluid storage systems disclosed herein are expected to operate. Moreover, these marine oils are widely available at an acceptable cost.

Those mineral oils useful for the purposes of the present invention are variously referred to as mineral oil, white oil, and liquid petrolatum. The ACS Registry number of these products is 8012-95-1. They are colorless liquids, consist primarily of aliphatic hydrocarbons, are FDA approved, and have the following characteristics which are significant as far as the present invention is concerned:

| | |
|---|---|
| Specific Gravity | 0.86–0.95 |
| Kinetic Viscosity (37.8° C.) | 10–38 centistokes |
| Boiling Point | 230–390° C. |
| Pour Point | −55° C. |
| Flash Point | 150° C. |

Representative of the white oils which can be used in the practice of the present invention are the low pour point 125 and 150 white mineral oils supplied by the Sonnebonn Division of Witco Corporation.

Suitable vegetable oils, like the marine and mineral oils identified above, have appropriately low viscosities—<100 centistokes—over the temperature range in which they are expected to operate (in more extreme low temperature conditions, a few percent of a low molecular weight alcohol such as ethanol or a light mineral oil can be used to keep the viscosity of the liquid at the required <100 centistokes level). The cost of those oils is moderate, and availability is not a concern. Moreover, those oils are nontoxic and do not pose a threat to the environment in the quantities in which they are employed for leak detection in the fluid storage systems disclosed herein. Furthermore, at temperatures in the operating range described above, these oils are inert in that they do not chemically attack the metals from which the containments of fluid storage systems are fabricated because they neither solubilize metals nor enable electrochemical reactions. Similarly, in the operating temperature range, vegetable oils do not chemically react with the polymers from which fluid storage system liners, overwraps, bladders, and other non-metallic containments are made.

Those vegetable oils currently considered suitable for the purposes of the present invention and the characteristics of those oils are:

OLIVE OIL:

Specific Gravity: 0.91–0.92

Freezing Point: 0° C.

Flash Point: 437° F. (225° C.)

Ignition Point: 650° F. (343° C.)

Viscosity at 25° C.: 30 centipoise

Cost: $1.82/pound

PEANUT OIL:

Specific Gravity: 0.91–0.92

Freezing Point: –5° C.

Flash Point: 540° F. (282° C.)

Ignition Point: 833° F. (445° C.)

Viscosity at 25° C.: ~30 centipoise

Cost: $0.90/pound

SOYBEAN OIL:

Specific Gravity: 0.924–0.929

Freezing Point: –12° C.

Flash Point: 540° F. (282° C.)

Ignition Point: 833° F. (445° C.)

Viscosity at 25° C.: ~29 centipoise

Cost: $0.59/pound

CORN OIL:

Specific Gravity: 0.916–0.921

Freezing Point: –10° to –18° C.

Flash Point: 321° C.

Ignition Point: 393° C.

Viscosity at 20° C.: 37 centipoises

Cost: $0.29/lb.

Palm and coconut oils and other similarly more saturated oils can also be employed. In this case, a diluent is typically mixed with the oil to keep its viscosity from exceeding the 100 centistokes limit at low temperatures. Useful diluents are those identified above—the lower alcohols such as ethanol and light mineral oils such as white oils and liquid petrolatums.

Upon exposure to the oxygen in air, vegetable oils tend to oxidize and consequently become more viscous. The rate of oxidation increases with the degree of unsaturation of the oil molecules (unsaturation is proportional to the number of carbon-to-carbon double bonds in the molecular structure). Those vegetable oil most useful as leak detecting liquids in the manner disclosed herein tend to have relatively high degrees of unsaturation. They are therefore correspondingly susceptible to oxidation.

An antioxidant can be added to the oil to retard oxidation-based increases in viscosity before the oil is put into the fluid storage system. Satisfactory antioxidants are tertiary butyl-hydroxoquinone (TBHQ), 2-tertiary-butyl-4-hydroxyanisole, and 3-tertiary-butyl-4-hydroxyanisole in minor amounts. Preferred is TBHQ in an approximately 0.02 to 0.025 percent concentration.

Particularly in the case in which one of the containments is metal and the other is an overwrap or bladder and post-welding after fabrication of the metal tank is not required, this oxidation problem can also be addressed by painting those surfaces of the fluid storage system with which the oil comes into contact.

It may also be found advantageous to add a few tenths of a percent of citric acid or a comparably acidic composition to the oil. This adjunct reacts with and reduces the concentration of any metallic ions that may be present in the leak detecting liquid. Such ions are unwanted as they catalyze those oxidation reactions which cause degradation of oils and consequent increases in their viscosity.

In the typical, closed, oxygen-free environment in which the leak detecting liquid is employed, the useful life of the liquid may range from one to many years. Periodic or continuous testing as with a viscometer can be used to detect those changes in the liquid which dictate that it be replaced.

The marine, mineral, and vegetable oils characterized above are so innocuous that they are all classified as food grade by the Food and Drug Administration and approved for human consumption.

Furthermore, any releases of the selected leak detecting liquid which might occur by way of leakage will be extremely small—well below even that minimum level at which the EPA requires reporting of a toxic chemical spill. Because of the small quantities involved and the lack of toxicity, released fluid can be easily cleaned up, especially if the system is installed on a concrete pad or otherwise located above a relatively impermeable surface.

Figure 1:
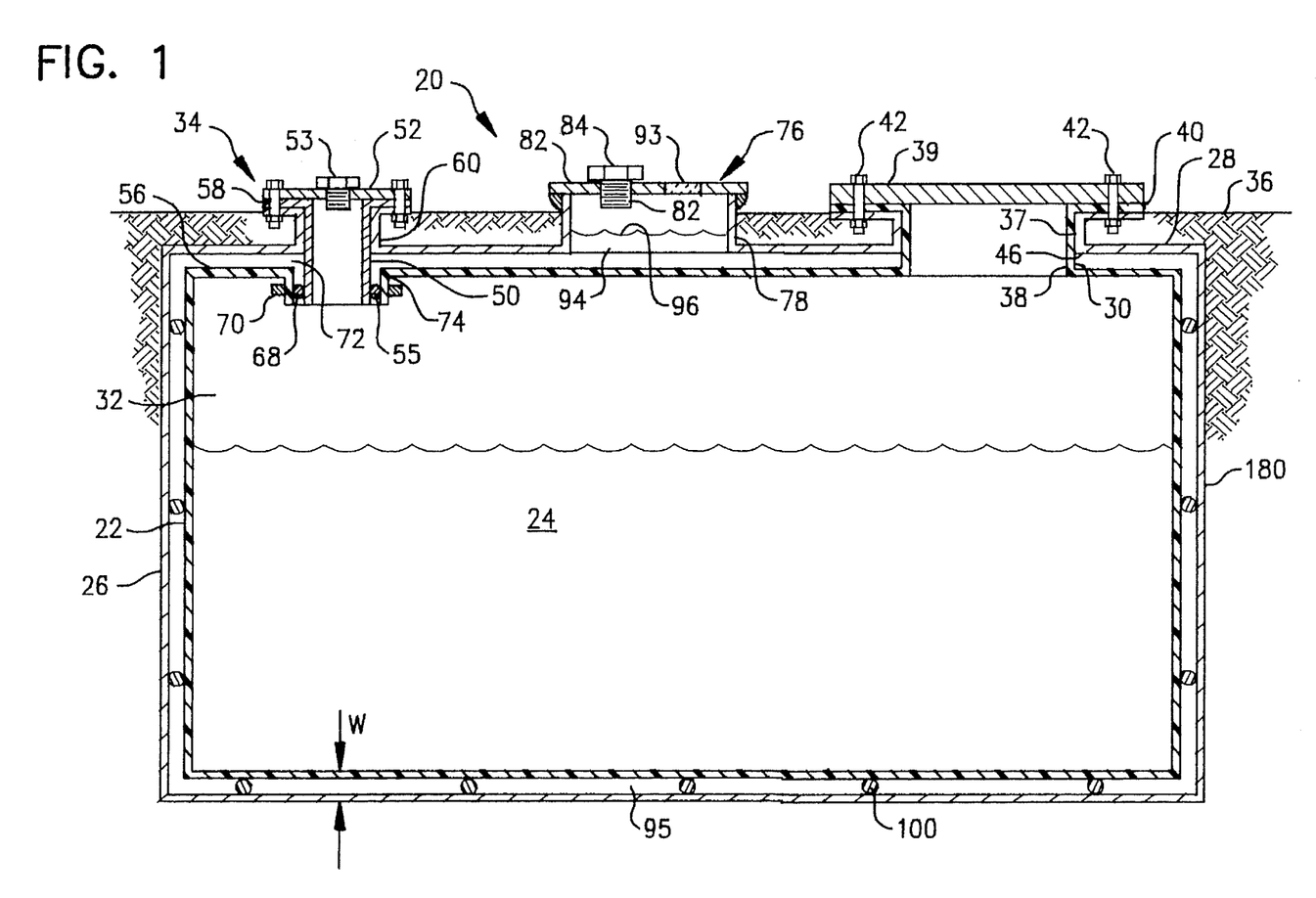
FIG. 1 is a vertical section through a fluid storage system in which provision is made for detecting leaks with an inert liquid in accord with the principles of the present invention.
Figures 1A, 1B:
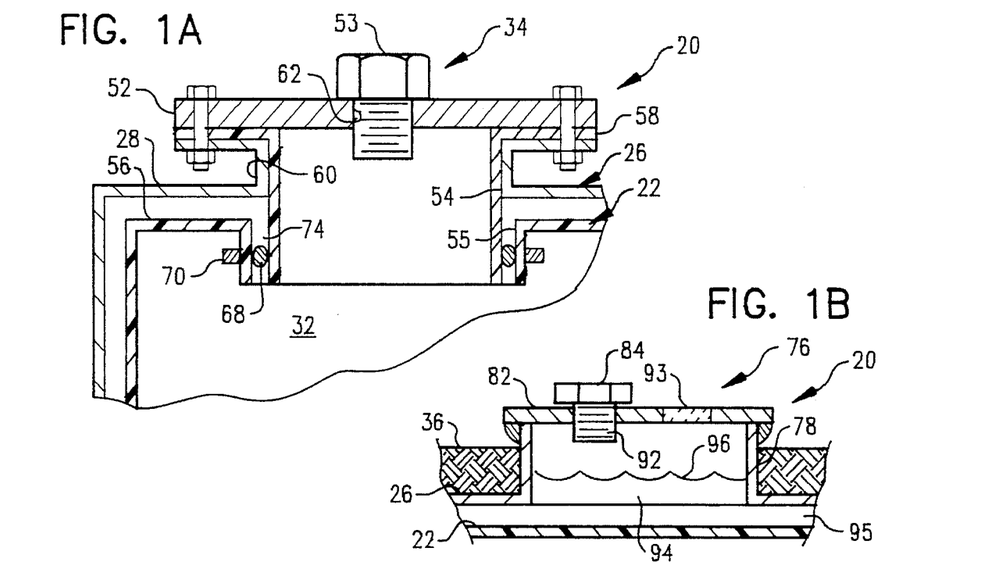
FIG. 1A is a fragment of FIG. 1 drawn to an enlarged scale to show the details of a vent/fill system employed in the storage installation of FIG. 1.
FIG. 1B is a fragment of FIG. 1 drawn to an enlarged scale to show the details of a reservoir employed in the FIG. 1 storage system to identify leaks in the primary and/or secondary containments of the system.

Referring now to the drawings, FIGS. 1, 1A, and 1B depicts a storage system 20 which employs a non-aqueous, non-corrosive, nontoxic liquid for leak detection in accord with the principles of the present invention. System 20 includes a distensible, bladder-like, primary containment 22 for a contained substance 24. Containment vessel 22 is installed in a rigid tank 26 which functions as a secondary containment. That tank keeps contained substance released from primary containment 22 from escaping into the surrounding environment—soil, water, air, etc. The outer containment 26 also protects the more susceptible primary containment 22 from damage by external forces and agencies.

Outer tank 26 is, by itself, not the present invention. Its details will accordingly be described herein only to the extent necessary for an understanding of the present invention.

Briefly, outer containment 26 is a vessel, typically fabricated of mild steel, which is designed to protect a primary containment filled with an environmentally hazardous fluid such as gasoline or other petroleum product and to keep escaped fluids from the surrounding environs. Communicating with the upper side 28 of tank 26 are a standard manhole 30, which furnishes physical access to the interior 32 of primary containment 22, and a vent/fill system 34. Both the manhole and vent/fill system are accessible from surface 36 in the representative embodiment of the invention illustrated in FIG. 1 in which the storage system 20 is buried.

Vent/fill system 34 is employed to fill and empty primary containment 22. It is also used for visual access to the interior of vessel 22 and its contents and for gauging the amount of contained substance 24 in the primary containment.

At its lower end, manhole 30 is integral with outer tank 26. It communicates with the interior 32 of primary containment 22 though an opening 37 in the upper side 28 of outer tank 26 and an opening 38 through primary containment 22. A conventional cover 39 is bolted or otherwise secured to a radial flange 40 at the upper end of manhole 30 as by bolts 42. Flexible primary containment 22 extends up through manhole 30 and is trapped between cover 39 and flange 40, forming a gasket between those components.

Vent/fill system 34 includes a flanged pipe or tubular fitting 50 with a cover 52 and a threaded cap 53. Fitting 50 extends into primary containment vessel 22 through an aperture 54 in the upper side 28 of secondary containment 26 and an aligned aperture 55 in the upper side 56 of primary containment 22. The fitting is secured in place and sealed to the secondary containment as by bolting it to an ANSI 150 lb. flange 58. This flange is located at the upper end of a hollow cylindrical connector 60 on the top side 28 of secondary containment 26.

Cap 53 is threaded into an opening 62 in cover 52. Removal of this cap accordingly affords access to the interior of primary containment 22 through tubular fitting 50.

A seal/compression ring set 68/70 keeps liquids, vapors, and gases from escaping through the gap 74 between fitting 50 and primary containment 22.

The primary containment or envelope 22 referred to above is a permeation resistant geomembrane which may be reinforced or unreinforced. It is typically fabricated from a polyvinyl chloride. Geomembrane 22 is completely surrounded by the leaked material-containing and primary containment protecting outer tank 26.

Another polymeric material from which primary containment 22 can be fabricated is Dupont's Hytrel. Hytrel is a polyester elastomer with a hard, polybutylene terphthalate phase and a soft, polyether glycol phase. The twenty or more available Hytrel compositions range from a soft pliable (40 Durometer) material to a rather hard material (70 Durometer). The first two digits of the Hytrel grade number give the durometer. Hytrel compositions in the 4000 series will typically be employed for the purposes of the present invention. The chemical resistance of a Hytrel material increases with its hardness, and materials in the 4000 series have adequate chemical resistance, yet are flexible enough for the purposes of the present invention.

Referring still to FIG. 1, a reservoir 76 for a nontoxic leak detecting liquid of the character described above is located on the upper side 28 of protective, outer, secondary containment 26. This reservoir is made up of: an upwardly opening, tubular segment 78 of the outer containment; a cover 82; and a fill cap 84. Cover 82 is fastened to tubular containment segment 78 in a leakproof relationship—for example, by welding (see FIG. 1B).

Cap 84 is threaded into an opening 92 through cover plate 82 and can be removed to introduce the leak detecting liquid into storage system 20 and to remove it from that system. A typically glassed in viewing port 93 in the cover plate affords observation of the leak detecting liquid and of the level (or absence) of the liquid from the reservoir.

In a system of the character illustrated in FIG. 1, the leak detecting liquid 94 is introduced into system 20 until the interspace 95 between primary and secondary containments 22 and 26 is filled and the liquid reaches the level in reservoir 76 indicated by reference character 96. If a leak develops in outer, protective containment 26 or in the primary inner containment 22, or if leaks develop in both containments, the level 96 of the leak detecting liquid will drop; and this lowering of the liquid level can readily be detected by one observing the leak detecting liquid in reservoir 76 through viewport 93.

Also, level 96 may be selected such that the presence of the leak detecting liquid in a previously empty reservoir or the absence of the liquid from a reservoir in which it was theretofore present can be used as an indication of an existent or developing leak.

It is important, in conjunction with the foregoing, that the volume of leak detecting liquid 94 in reservoir 76 is very small compared to the volume of that liquid in the interspace 95 between the primary and secondary containments 22 and 26. The result of this is that a relatively small leak from storage system 20 will produce a relatively large, and easily detected, decrease in the level of the leak detecting liquid in reservoir 76.

It is also important in the leak detection technique just described that the leak detecting liquid be able to flow freely through the interspace 95 between the primary and secondary containments 22 and 26. To achieve this, it is typically required that the width w of interspace 95 be in the range of ⅛–¼ inch.

In those applications of the invention in which both the primary and secondary containments are fabricated from rigid materials, this spacing may be provided by appropriately dimensioning the two containments. If one or both of the primary and secondary containments is flexible or distensible, the spacing may be provided by wrapping a flexible, typically polymeric, material 100 which is chemically inert with respect to the leak detecting liquid around the primary inner containment. Alternatively, the spacing may be provided by ribs on the interspace bounding side of one of the containments. Also, an inner and/or outer containment embossed or otherwise figured as disclosed in parent application No. 07/673,772 or as shown at 102 in FIG. 2 or a layer of material which has communicating pores or interstices in containment interspace 95 as described in the same application may be used to space the primary and secondary containments apart.

In fluid storage systems like that identified with reference character 20, the leak detecting liquid may leak into primary containment 22 if a leak exists or develops in that containment. However, it is a virtue of the present invention that any resulting contamination of the contained fluid material 24 will almost always be insignificant because of the benign characteristics of the leak detecting liquid and the very small concentrations in which the leak detecting liquid would be present in the contained fluid.

Figure 2:
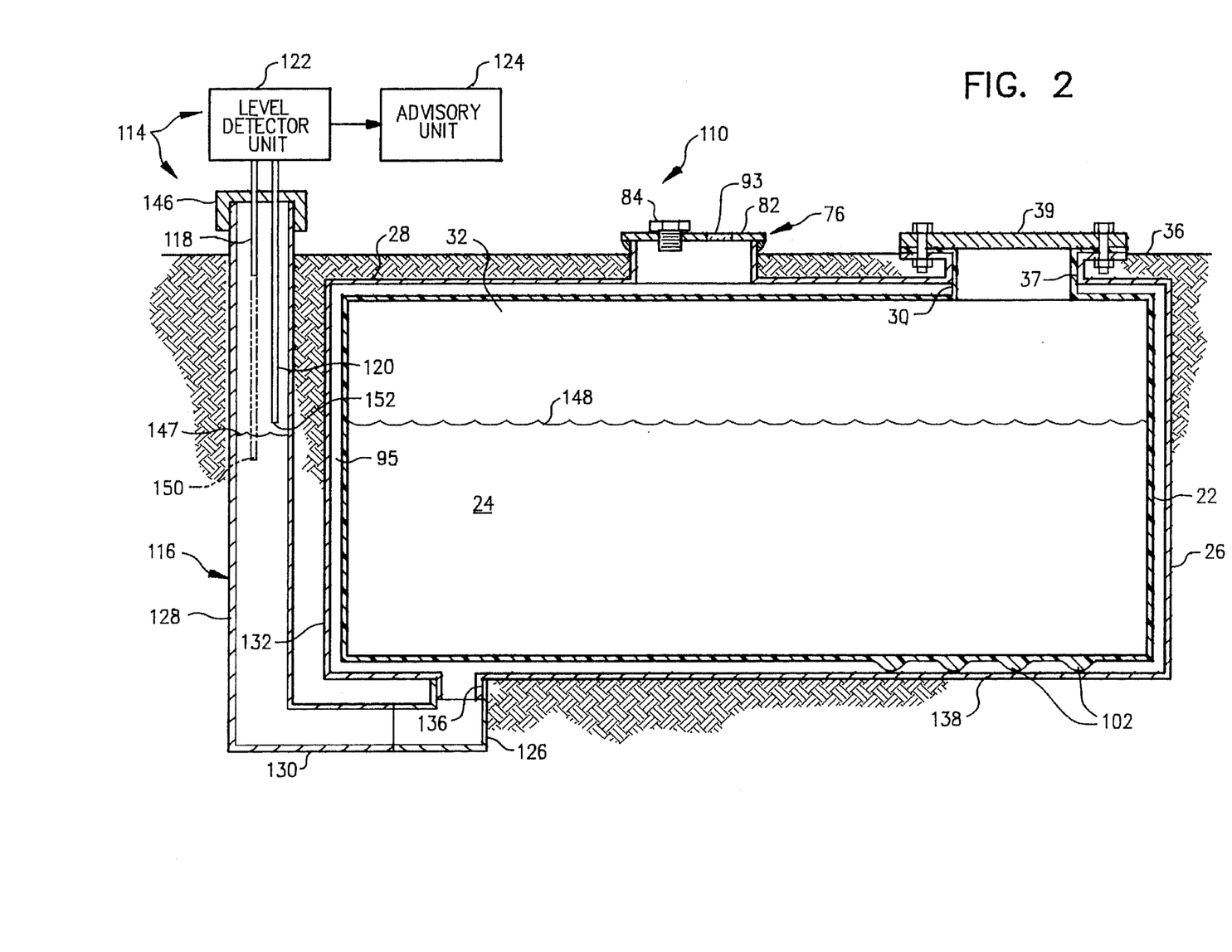
FIG. 2 is a vertical section through a second, buried, fluid storage system embodying the principles of the present invention.
Figures 2A, 3:
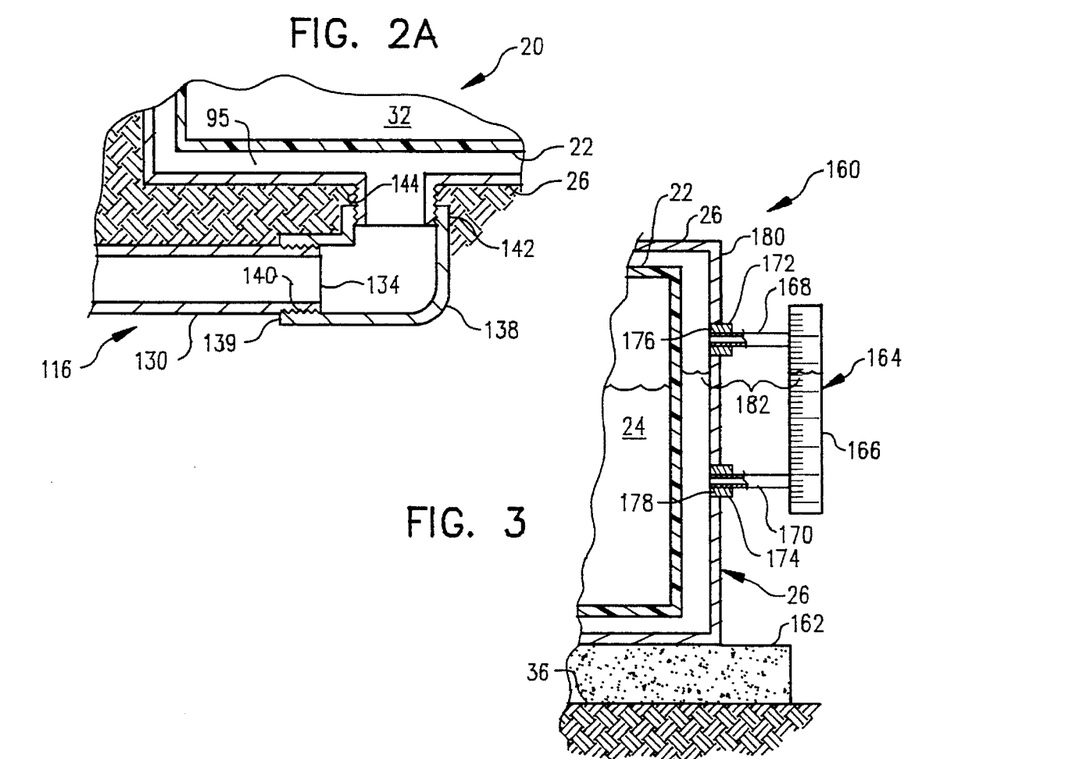
FIG. 2A is a fragment of FIG. 2 drawn to an enlarged scale to show the details of a standpipe employed in the FIG. 2 storage system for leak detection purposes.
FIG. 3 is a partially sectioned fragmentary view of a third fluid storage system in which the principles of the present invention are embodied; this system employs a sight glass to monitor those changes in the level of a leak detecting liquid which may be indicative of possible leaks in the system.

Referring again to the drawings, FIGS. 2 and 2A depict a fluid storage system 110 which is in many respects like the storage system 20 just described. To the extent that this is true, the same reference characters will be employed in describing that embodiment (and subsequent embodiments) to identify those system components which are alike. Also, in FIGS. 2 et seq. details such as the vent/fill system 34 have in several cases been omitted for the sake of clarity.

System 110 is like storage system 20 in that it is buried below surface 36. As in system 20, the tubular, reservoir-incorporated segment 78 located at the upper side 28 of secondary containment 26 and communicating with the containment interspace 95 is long enough to locate viewport 93 above surface level 36. This of course facilitates the observation of the level of the leak detecting liquid in the reservoir.

As an alternative to extending segment 78 above grade, it may be housed in a belowground vault with a removable cover which gives access to viewport 93.

Storage system 110 differs from storage system 20 by the addition of a second leak detection system 114. This system includes a standpipe 116, liquid level detecting probes 118 and 120, a level detector unit 122, and an advisory unit 124.

Standpipe 116 has a vertically oriented leg 128 which extends above the surface 36 of the soil or other material in which system 110 is buried and a horizontally oriented leg 130 which extends beyond the left-hand end 132 of secondary containment 26, enabling standpipe 116 to clear this outer containment.

An alternative is to connect the horizontal leg 130 of standpipe 116 through an end wall of outer containment 26 to interspace 95 instead of through the bottom wall of that containment as shown in FIG. 2.

Communication between the inlet 134 of the standpipe and containment interspace 95 in the FIG. 2 embodiment of the invention is provided by an integral, tubular elbow 136 on the lower side 138 of secondary containment 26. Standpipe segment 130 and fitting 136 are mechanically joined in a fluidtight relationship at one end 139 of the fitting by threads 140 or by welding, etc. The opposite end 142 of the fitting is similarly coupled to an integral, tubular inlet segment 144 of outer containment 26.

Level sensitive probes 118 and 120 extend through a cap 146 sealed to the upper end of vertically extending standpipe leg 128 and downwardly through the standpipe leg.

In one leak detection technique employing system 114, only probe 118 is employed. In this technique, fill cap 84 is removed; and the selected leak detecting liquid is introduced into system 110 until the containment interspace 95 is filled and the liquid in standpipe 116 reaches the same level 96 to which reservoir 76 is filled in the leak detecting technique discussed above in conjunction with FIG. 1.

If a leak is existent, or thereafter develops in secondary containment 26 or in primary containment 22, the level of the liquid detecting liquid 94 in standpipe 116 will decrease, uncovering the lower end of, and activating, level sensitive probe 118. Thereupon, a signal is generated in level detector unit 122; and advisory unit 124 is activated.

The signal generating and processing circuitry in level detector unit 122 is conventional as are the components of advisory unit 124. These may include a visual monitor, a strip or other recording instrument, and/or alarms. Because the components of both units 122 and 124 are widely available and because the details of those units are not part of the present invention, neither unit will be described in greater depth herein.

Another technique for employing leak detecting system 114 is designed primarily for applications involving the static storage of contaminated or otherwise toxic fluids; i.e., for applications in which the volume of liquid in primary containment 22 remains unchanged.

In this case, the containment interspace 95 and standpipe 116 are filled with the selected, nontoxic, leak detecting liquid to a lined 147 below the level 148 of the liquid 24 stored in primary containment 22; and probes 118 and 120 are dimensioned so that the lower, liquid level detecting end 150 of probe 118 is slightly below level 148 and the lower end 152 of the second probe 120 slightly above the same level.

In this case, liquid leaking through an existent or developing leak in primary containment 22 will cause the level of the liquid in standpipe 116 to rise. This results in the liquid contacting level sensitive probe 120 and in an advisory warning of a possible leak being generated by unit 124 as a consequence. On the other hand, if a leak develops in outer containment 26 or in both containments, the level of the leak detecting liquid in standpipe 116 will drop, exposing the lower end 150 of the level sensitive probe 118. Again, this will result in unit 124 generating an appropriate advisory.

Furthermore, if a leak develops in outer containment 26 in an application in which the system is buried or submerged, and the level of the ground water or other fluid in the vicinity of the tank is above the level of the leak detecting liquid in interspace 95: (1) liquid will flow into the interspace from the surrounding environs through the leak; (2) the level of the leak detecting liquid in the interspace will rise; and (3) the liquid will contact the lower end 152 of probe 120, causing the leak indicative advisory to be generated.

As in the case of the leak detecting technique discussed above in conjunction with storage system 20, the cross-sectional area of vertical standpipe leg 128 is relatively small in comparison to the volume of the leak detecting liquid in containment interspace 95.

In yet another technique for employing a standpipe-type leak detecting system, system 114 is replaced or supplemented with a viewport in the component 146 capping the upper end of standpipe 116 in a manner akin to that by which viewport 93 is provided in the reservoir cover 82 of leak detecting system 110. This provides for visual observations of leak indicative drops in the level of the leak detecting liquid 94 in the standpipe.

Another variation, applicable to both storage system 20 and storage system 110, is to locate the leak detecting reservoir 76 at a location removed from the primary and secondary containments and connect the reservoir to the primary and secondary containment interspace 95 with appropriate piping. Also, floats and other level responsive devices can be substituted for the liquid sensitive probes 118 and 120 shown in FIG. 2. Furthermore, in a system like that illustrated in FIG. 2, a microprocessor can be readily included in level detector unit 122, if one is not already present in the signal generating and processing circuitry. That microprocessor can be programmed so that leak detecting system 114 will ignore, and not report as leaks, changes in the level of the leak detecting liquid engendered when interspace 95 is filled, by permeation, by changes in pipeline pressure, etc.

A myriad of other changes may of course be made within the compass of the present invention. Also, as suggested above, the direct, volumetric techniques just described are not limited to storage systems with the particular combination of flexible primary containment and rigid secondary containment illustrated in FIGS. 1 and 2. Such techniques may also be employed in storage systems in which both containments are rigid or flexible as well as those with a rigid primary containment and a flexible overwrap employed to isolate leaked fluids from the surrounding environs.

A number of attributes of the storage systems 20 and 110 illustrated in FIGS. 1 and 2 have been described above. Another is that, particularly with the welded and O-ring/compression ring sealing systems discussed above, the containment interspace and auxiliary components such as reservoirs and standpipes containing the leak detecting liquid are effectively isolated from the ambient atmosphere. Consequently, oxygen which might degrade the selected liquid and thereby increase its viscosity is effectively excluded from the areas occupied by this liquid, giving it the perhaps multiple year useful life discussed above. This is particularly true when paints or other coatings are employed to keep the liquid from contacting bare metal and/or an antioxidant is included in the leak detecting liquid.

Level change responsive, leak detecting techniques employing the principles of the present invention are employable in above-ground storage systems as well as the vault-type and buried systems illustrated in FIGS. 1 and 2. One, representative only, above-ground storage system is illustrated-in fragmentary form in FIG. 3 and identified by reference character 160.

In the application of the present invention illustrated in that figure, the rigid, outer, secondary containment 26 of the system is supported above surface 36 on a concrete or other pad 162. The leak detecting system 164 of installation 160 includes a conventional sight glass 166 with upper and lower taps 168 and 170. These taps communicate with the interspace 95 between primary and secondary containments 22 and 26 through elastomeric seals or bushings 172 and 174. The bushings are installed in openings 176 and 178 through the right-hand end wall 180 of the protective outer containment 26.

In this installation, containment interspace 95 is filled with the selected, nontoxic, leak detecting liquid to a level 182 just below the upper tap 168 to sight glass 166, causing the leak detecting liquid to rise to the same level in the sight glass. Therefore, an existent or developing leak in secondary containment 26 or in primary containment 22 will result in the liquid level dropping in the sight glass and providing a visual indication of the leak because the liquid level in the sight glass seeks the level of the fluid 24 in primary containment 22.

Figure 4:
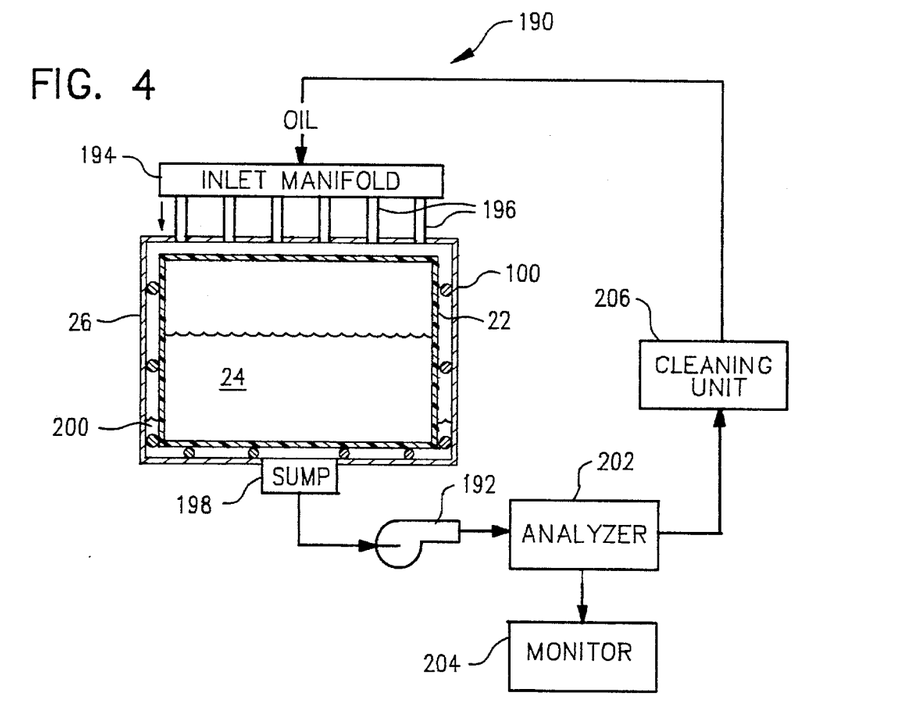
FIG. 4 is a generally schematic view of a storage system embodying the principles of the invention in which the leak detecting liquid is circulated through a space between primary and secondary containments and then analyzed for the presence of foreign substances indicative of a possible leak in the system.

FIG. 4 depicts a storage system 190 which differs from those discussed above in that it employs indirect rather than direct leak detection. In system 190, it is the presence of contaminants in the leak detecting liquid rather than a volumetric change (i.e., a change in the level) of the liquid that is employed as an indication of a possible existent or developing leak.

In this system, the selected leak detecting liquid is circulated by pump 192 from an inlet manifold 194 through inlet lines 196 spaced therealong into the interspace 95 between primary, inner and secondary, outer containments 22 and 26. These inlets are so spaced that fluid discharged from them into interspace 95 will flow in a continuous film over the exterior surfaces of the primary containment and then into a sump 198. The sump is formed on the lower side 138 of secondary containment 26 and communicates with interspace 95. The rate-of-flow of the inert leak detecting liquid is maintained at a level high enough to keep liquid in interspace 95 at the level indicated by reference character 200. This ensures that the leak detecting liquid will wash across the lower parts of the inner containment outer surface as it flows towards sump 198, picking up contaminants leaked through the lower part of the primary containment 22.

Fluid or liquid leaked from primary containment 22 as well as leachates and other fluid materials leaked into inner containment space 95 through a leak in outer containment 26 are, by virtue of the foregoing, picked up by the leak detecting liquid introduced into intercontainment space 95 as that liquid flows to and into sump 198.

From sump 198, the leak detecting liquid, together with any contaminants, is pumped into an analyzer 202 which may include a radiation detector such as a geiger counter or scintillator, an infrared or ultraviolet spectrometer, a radiographic analyzer, etc., or a combination of devices for detecting the presence of contaminants in the liquid indicative of a leak. The analyzer can also be used to quantify the contaminants and thereby assess the magnitude of the leak.

Results can be displayed on a conventional monitor 204 which may also include: a strip chart or other recorder for making a permanent record, an alarm activated if analyzer shows that leakage has exceeded a preselected threshold level, etc.

From analyzer 202, the leak detecting liquid is circulated to a cleaning unit 206 and then back to inlet manifold 194. Cleaning unit 206 may include conventional filters, scrubbers, and other devices customarily employed to remove foreign substances from lightweight oils.

Like the storage systems discussed above, the one illustrated in FIG. 4 confines the leak detecting liquid to an environment which can be effectively isolated from the air in the ambient surroundings. Again, therefore, the leak detecting liquid is protected against oxidative degradation with a consequent, significant increase in its useful service life.

Figure 5:
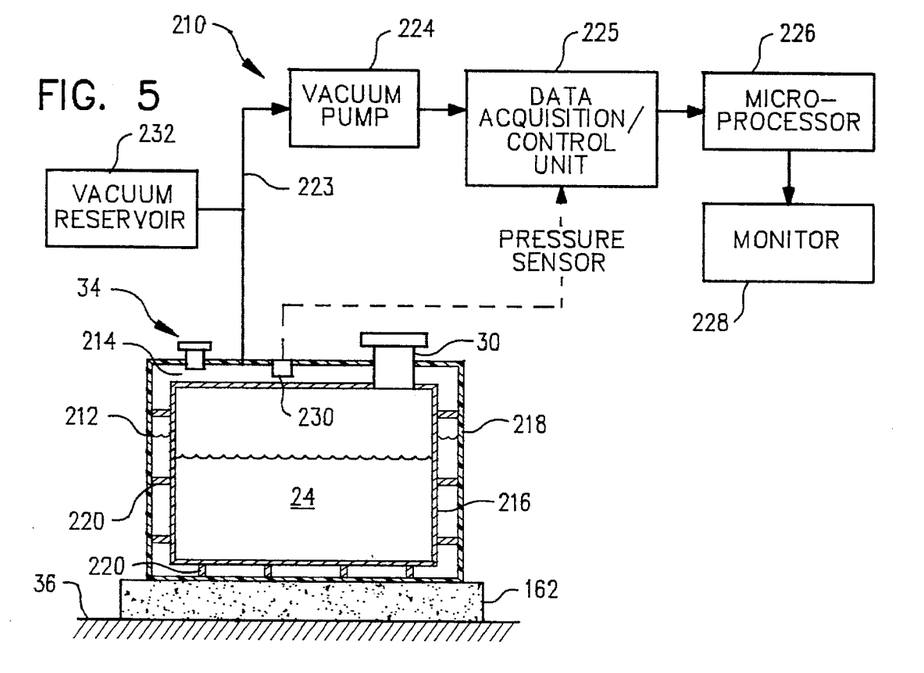
FIG. 5 is a generally schematic view of a storage system embodying the principles of the invention in which changes in the pressure on an inert liquid in an intercontainment space are employed to identify possible leaks.

Referring again to the drawing, FIG. 5 depicts a storage system 210 embodying the principles of the present invention and indirect leak detection in which a vacuum or negative pressure is maintained in the interspace 95 between inner and outer, primary and secondary containments 22 and 26 for the stored fluid 24. A loss of vacuum in interspace 95 is taken as an indication of a leak in one of the containments; and a nontoxic, inert liquid as described above is employed to protect the containments from moisture-laden air, from aggressive fluids leaked from primary containment 22 into interspace 95, from leachates and other reactive fluids leaked into that space through outer containment 26, and from other harmful materials reaching the intercontainment space 95. For optimal protection, interspace 95 will be filled with the selected inert liquid to a level such as that indicated by reference character 212. That minimizes the head room 214 in interspace 95 and, consequently, the area of the containment surfaces that are subject to possible attack.

Storage system 210 also differs from those discussed above in that it has a steel or other rigid primary containment 216 enveloped in a permeation resistant geomembrane overwrap 218. Ribs 220 provide the requisite spacing between the primary and secondary containments 22 and 26. Due to the negative pressure in intercontainment space 95, overwrap 218 is drawn tightly against these ribs, accurately controlling the volume of the space between the two containments and making very accurate leak detection practical.

The vacuum is maintained in interspace 95 by a vacuum pump 224 communicating with the interspace through vacuum line 223. The operation of the vacuum pump is controlled by a data acquisition/control unit 225 which transmits information to and receives instructions from a microprocessor 226. Advisories indicative of leaks are displayed on a monitor 228 controlled by microprocessor 226; and alarms, strip recorders, and the like may also be provided and operated by the microprocessor.

Different modes of operation are provided by the just described leak detecting system.

In one, vacuum pump 224 is operated at selected intervals; and the time required to restore the pressure in interspace 95 to a selected level is noted each time the pump is operated. If this time increases from one interval to the next, as reported by unit 225 to microprocessor 226, the development of a leak is a likelihood; and the microprocessor will accordingly cause an appropriate advisory to be displayed on monitor 228.

An equally viable technique is to operate vacuum pump 224 whenever the pressure in interspace 95 rises above a selected threshold. If the frequency of operation of pump 224 increases, it is again likely that a leak has developed in one or both of the system containments 216 and 218. Data on the frequency of pump operation is reported by unit 225 to microprocessor 226. An advisory message is displayed on monitor 228 if the frequency of operation data indicates the likelihood of a leak having developed. Also, in this mode of operation, the magnitude of the ostensible leak can be quantified by noting the duration of the period for which the pump is operated in each operating cycle.

In both cases, accurate leak detection is afforded because of the pressure differential drawing the overwrap 218 against ribs 220 and thereby accurately controlling the interspace volume. For the same reasons, accuracy is available in systems like that illustrated in FIG. 5 but employing a flexible liner as a primary containment, and in systems in which both containments are distensible.

Systems of the character illustrated in FIG. 5 are particularly sensitive to the development of leaks. Only a modest change in the level of the leak detecting liquid in interspace 95 generates a pressure change in headspace 214 of several tenths of a pound per square inch. Pressure changes of that magnitude are readily detected by commercially available pressure sensors such as that identified by reference character 230 in FIG. 5 and employed to input pressure related information to data acquisition/control unit 225.

A vacuum reservoir 232 will typically be connected in parallel with vacuum pump 224 to vacuum line 223 in a system of the character illustrated in FIG. 5 but with a rigid outer containment and a bladder-type primary containment. This ensures that the primary containment remains in place until the operation of the vacuum pump can be restored if that operation is interrupted.

Figure 6:
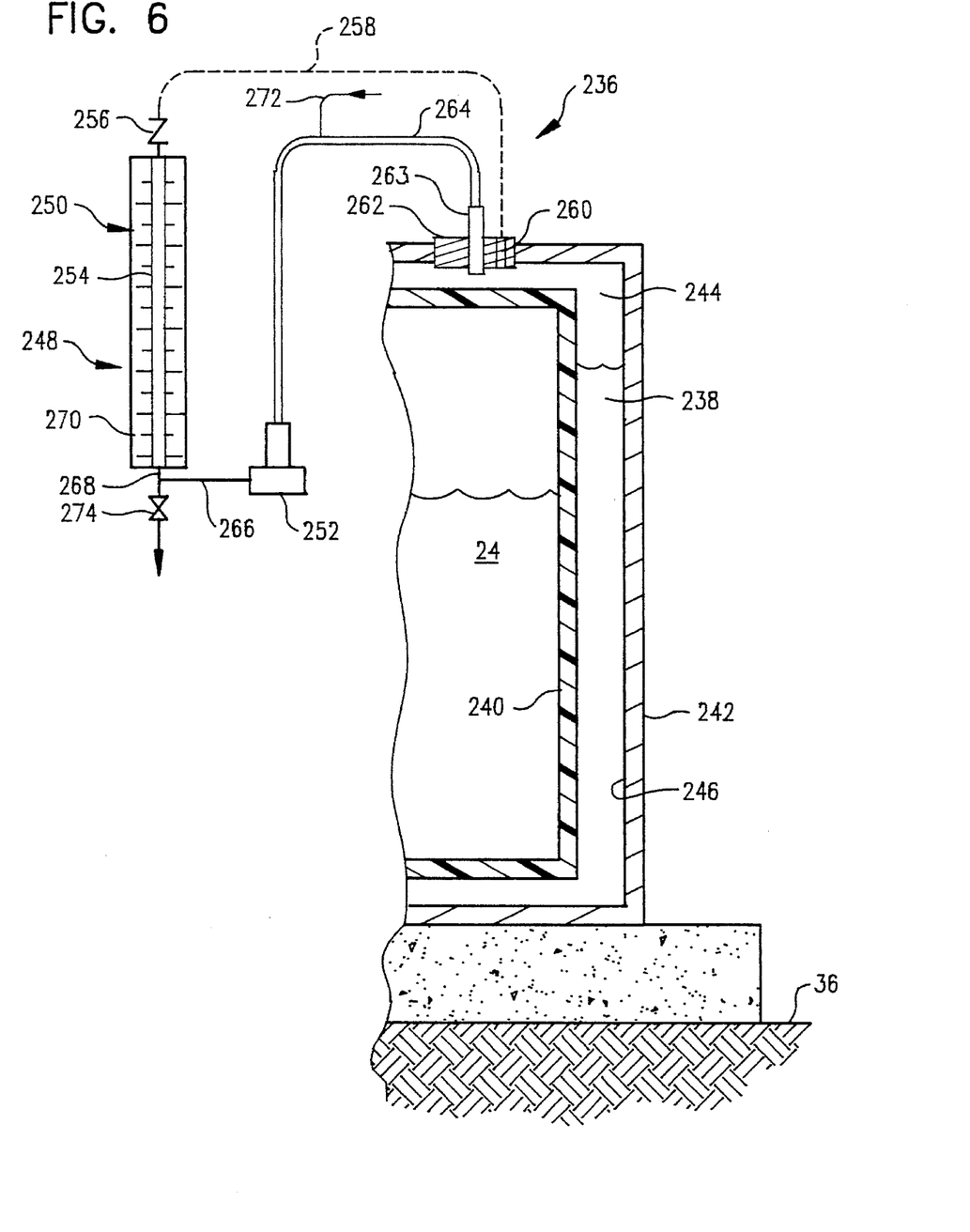
FIG. 6 is a generally schematic view of a second storage system in which pressure changes are employed to identify possible leaks.

Yet another fluid storage system employing the principles of the present invention and using a change of the pressure on an incompressible, leak detecting fluid as an indication of a possible leak is illustrated in FIG. 6 and identified by reference character 236. In this system, as in others of those described above, the leak detecting liquid 238 is confined between the primary and secondary, inner and outer containments 240 and 242 of the system with a headspace 244 above the leak detecting liquid. Leakage of fluids into the interspace 246 between containments 240 and 242, leaks through secondary containment 242, and leaks into containment interspace 246 if the system is buried with the liquid level in interspace 246 below the level of a fluid in the surrounding environs will all cause a change of the pressure in headspace 244.

Pressure in this headspace is monitored, and potential leaks detected, with a conventional manometer 248 such as the model 1700-1 well type manometer supplied by Petrometer Corporation.

Manometer 248 includes an indicator unit 250 and a well 252. The upper end of the column 254 in the indicator unit communicates with the headspace 244 between primary and secondary containments 240 and 242 through: a check valve 256; equalizing line 258; and an aperture 260 through a fitting 262 in the outer, secondary containment 242.

The bottom of the indicator unit column 254 likewise communicates with headspace 244, in this case through fitting supported down pipe 263, a transmission line 264, well 252, and lines 266 and 268. Consequently, a change in the headspace pressure will result in the meniscus of the fluid column 254 moving up and down, a phenomenon made readily observable by indicator unit scale 270.

In addition to the foregoing components, manometer 248 includes: (1) a line 272 through which a gas such as compressed air can be introduced to purge indicator unit 250; and (2) a valve 274 which can be opened to drain indicator unit 250 but is closed during that operation of the indicator unit described above.

Figure 7:
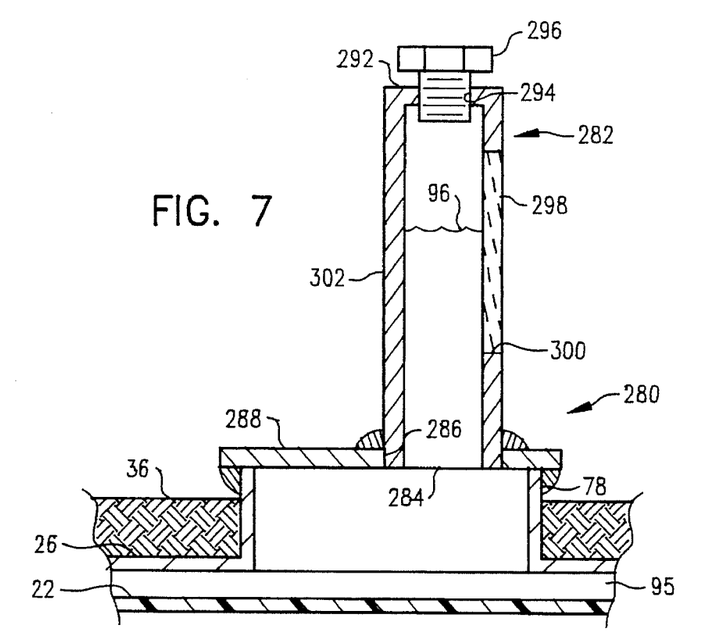
FIG. 7 is a fragmentary view of yet another storage system embodying the principles of the present invention; in this system changes in the liquid level in a standpipe located on the upper side of a containment vessel are employed as evidence of a possible leak.

Referring again to the drawing, FIG. 7 depicts an above-ground fluid storage system 280 of the character described above with a liquid detection system which includes a standpipe 282 which is a hollow, cylindrical tube. At its lower end 284 this tube is fitted in a complementary aperture 286 formed in a flat, horizontally oriented cover 288 and fixed to the cover as by welding. Cover 288 is seated on the upwardly extending, tubular segment 78 of outer or secondary containment 26 and is welded to the tubular segment.

At its upper end, standpipe 282 has an integral wall 292 with an opening 294 into which a removable filler cap 296 is threaded.

Midway between its lower end 284 and top wall 292, a window 298 is fitted in an opening 300 formed in the side wall 302 of standpipe 282.

In this embodiment of the invention, the selected leak detection liquid is introduced through aperture 294 into standpipe 282 until the interspace 95 between secondary and primary containers 26 and 22 is filled and the liquid 94 rises in standpipe 282 to the level identified by reference character 96. This level is approximately midway between the upper and lower margins 284 and 292 of the standpipe.

A drop in level 96 is an indication of a probable leak in primary containment 22 or in secondary containment 26 or of concurrently existing leaks in both containments. The magnitude of the leak(s) can be ascertained by observing the magnitude of the drop in liquid level over a given period of time. Level readings can be facilitated by a scale (not shown) on observation window 298.

There may be instances in which a storage system of the character illustrated in FIG. 7 is employed below ground with the water table, leachate, or other fluid level in the ambient surroundings above the level of 96 of the leak detecting liquid 94 in standpipe 282. In circumstances of this character, the level 96 of the liquid 94 may also rise in standpipe 282. This phenomenon is an indication of a probable leak of liquid from the ambient surroundings into interspace 95 through a breach in secondary containment 26.

The accuracy with which leaks can be detected by employing the principles of the present invention as developed above can be affected by those thermally induced or other distortions in the configurations of the inner and outer, primary and secondary containments which might affect the volume of the interspace between those components.

Figure 8:
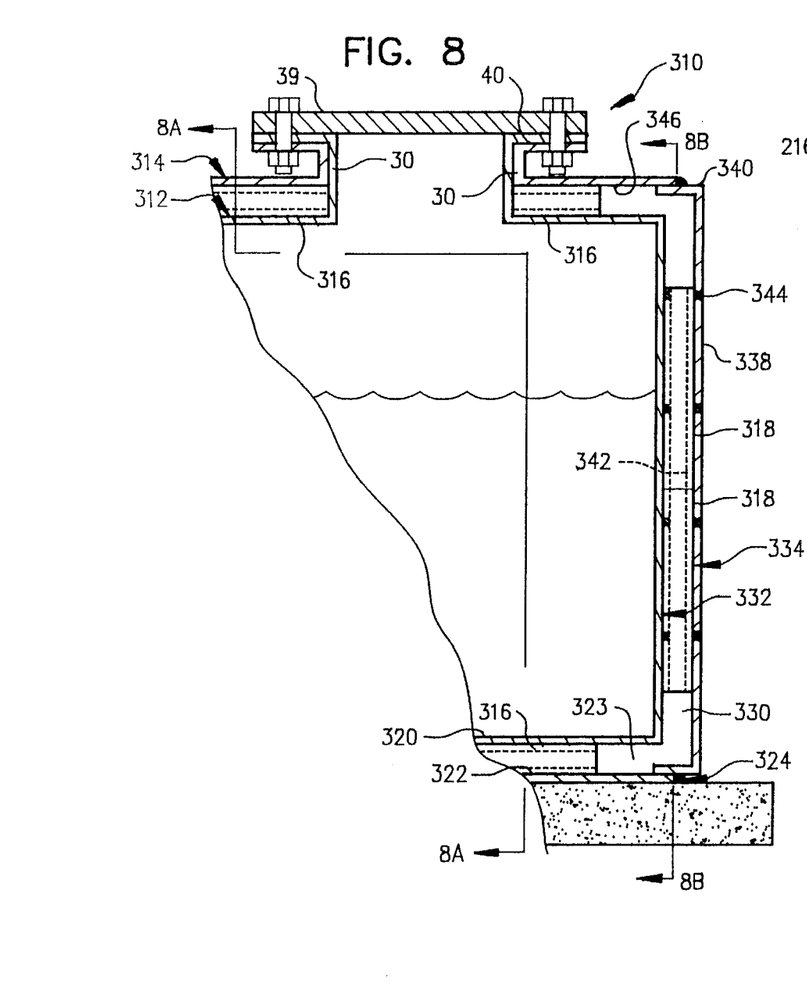
FIG. 8 is a partial view of one storage system embodying the principles of the present invention in which provision is made for controlling the interspace volume between inner and outer containments in a manner which promotes leak detection accuracy.
Figure 8A:
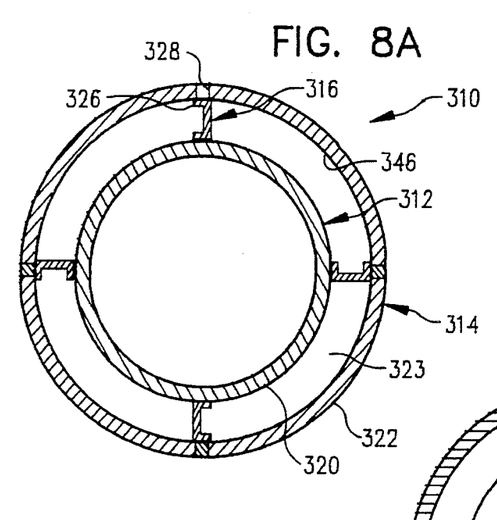
FIG. 8A is a section through FIG. 8, taken substantially along line 8A—8A of the latter figure.
Figure 8B:
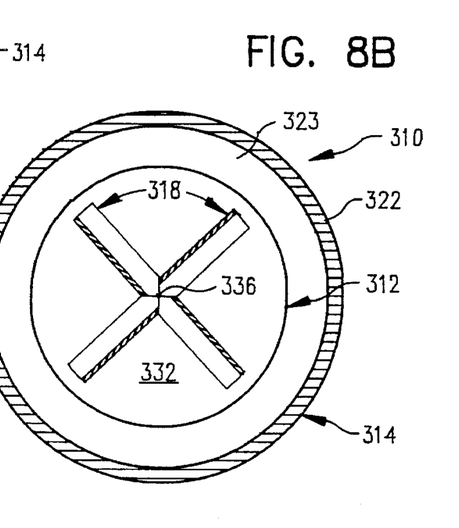
FIG. 8B is a section through FIG. 8, taken substantially along line 8B—8B of the latter figure.

FIGS. 8, 8A, and 8B depict a storage system 310 which employs the principles of the present invention and is so constructed as to minimize distortions in its typically steel inner, primary containment 312 and secondary, outer container 314 that might affect the accuracy of the installation's leak detecting system (not shown). This is accomplished by employing longitudinal side wall stiffeners 316 and transverse end wall (or head) stiffeners 318 to add rigidity and to integrate the system components into a unitary structure.

Longitudinal stiffeners 316 are installed between the side walls 320 and 322 or primary and secondary containments 312 and 314. These stiffeners may extend substantially the length of the inner, primary containment 312 as shown in FIG. 8. They span the gap 323 between primary and secondary containment side walls 320 and 322, and they are spaced at equal intervals around the periphery of the inner containment 312 as shown in FIG. 8A.

In the manufacturing process, stiffeners 316, which may be the conventional channels shown in FIG. 8A, are welded or otherwise fastened to primary containment side wall 320. Next, the assembly of inner containment 312 and longitudinal stiffeners 276 is slid into the secondary containment 286 through an open end 324 of the latter. The outer containment or shell 314 is then welded to the outer flanges 326 of stiffeners 316 through holes 328 in the outer containment side wall 322, care being taken to ensure that a liquidtight seal is formed in each opening.

Except as discussed below, the stiffener schemes at the two ends of installation 310 are virtually identical. Consequently, only the right-hand end of the installation has been shown in FIG. 8; and only the arrangement of transverse stiffeners 318 employed at that end of the installation will be described below.

Continuing then, containment head stiffeners 318 may also be conventional channels dimensioned to span the gap 330 between the right-hand head 332 of inner containment 312 and the complementary head 334 of outer containment 314. The stiffeners are equiangularly arranged about the center 336 of inner containment head 332 as shown in FIG. 8B and typically affixed as by welding to the inner containment head.

With the assembly of stiffeners and inner containment 312 installed in the outer containment 314 as discussed above, those transverse stiffeners 318 at the left-hand end of the installation butt against the head (not shown) at the left-hand end of outer containment 314. The outer, left-hand head is then fastened to the stiffeners by welding through openings in the outer head.

As shown in FIG. 8, the head 334 of secondary containment 314 at the right-hand end of installation 310 has a flat wall 338 surrounded by an integral, annular, peripheral flange 340. Once the innercontainment/stiffener assembly has been installed in secondary containment 314, head 334, which is configured and dimensioned to fit within the side wall 332 of secondary containment 314, is installed and welded in place (see FIG. 8).

Finally, the wall segment 338 of the right-hand head 334 of secondary containment 314 is welded to the outer flanges 342 of stiffeners at the right-hand end of installation 310 through openings 344 in head 334.

As will be apparent to the reader, the result is an integrated structure in which distortion is minimized both by the rigidity which stiffeners 316 and 318 impart and by the integrating of the inner and outer containment side and end walls 280, 282, 320 and 322, the containment heads at the left-hand end of the installation and the heads 332 and 334 at its right-hand end with the stiffeners. This results in a resistance to distortion of the primary and secondary containments, thereby minimizing changes in the volume of the interspace 346 between the two containments with a consequent increase in the accuracy of the leak detection system employed in installation 310.

Figure 9:
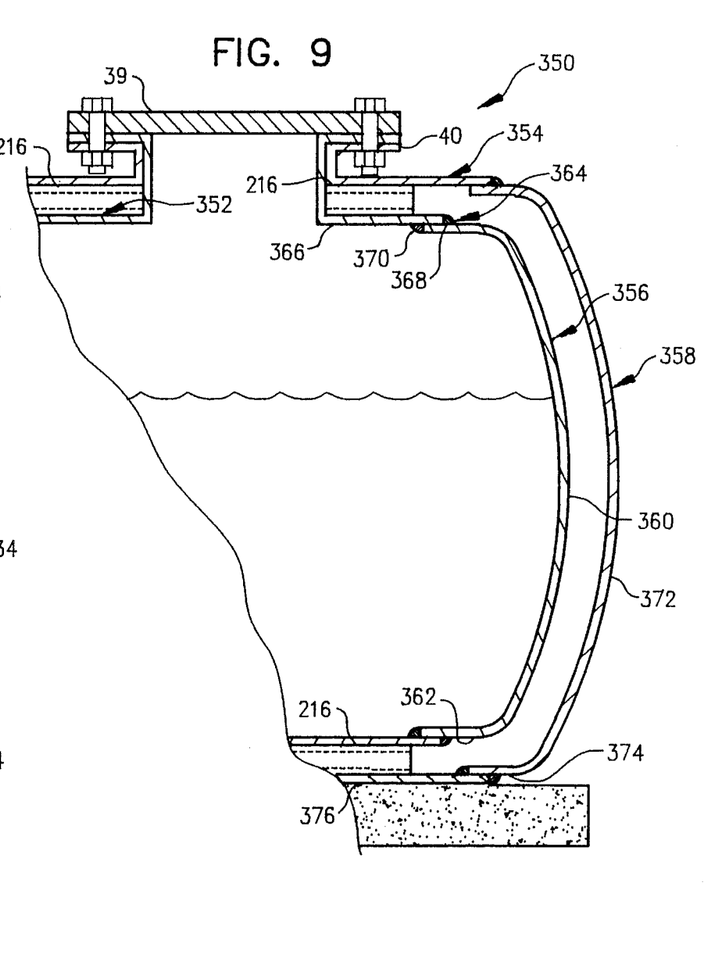
FIG. 9 is a partial view of yet another storage system embodying the principles of the present invention in which provision is made for promoting leak detection accuracy by controlling the interspace volume between primary and secondary containments.

Particularly susceptible to distortion are the heads of the primary and secondary containments employed in the type of system with which the present invention is concerned. Decreases in the accuracy of the installation's leak detecting system attributable to distortion of the primary and secondary containment heads can also be minimized, although at perhaps greater expense, by replacing the flat heads of those embodiments discussed above with domed heads. An installation of that character is illustrated in FIG. 9 and identified by reference character 350. The primary and secondary containments of this installation are identified by reference characters 352 and 354, and the domed heads of these containments are identified by reference characters 356 and 358.

The domed head 356 of the primary containment has an arcuate end wall segment 360 surrounded by an integral, peripheral flange 362. Head 356 is configured and dimensioned to fit within the open, right-hand end 364 of inner containment 352. The peripheral flange 362 of the head is welded to the side wall of the shell 366 of inner containment 352, typically at both the exposed ends of the flange and at the exposed end of the inner containment end wall 360. Representative beads are indicated at 368 and 370 in FIG. 9.

Outer domed head 358 has an arcuate end wall segment 372 surrounded by an integral peripheral flange 374. Head 358 is installed in and assembled to the side wall 376 of secondary containment 354 in the same manner that head 356 is assembled to primary containment 352.

Domed heads of the character just described (not shown) are also assembled to the shells 320 and 322 of primary and secondary containments 312 and 314 at the left-hand end of storage system 350 in the manner just described.

Also, as shown in FIG. 9, logitudinal stiffeners 318 of the character discussed above and illustrated in FIGS. 8 and 8A can be employed to even further minimize distortions of primary and secondary containments 312 and 314 with a consequent increase in the control over the volume of the interspace 378 between those containments.

For the sake of convenience and other reasons, this detailed discussion has been limited to those applications of the invention which are fluid storage systems with inner and outer, primary and secondary containments. However, it will be apparent to those skilled in the relevant arts that those principles are equally applicable to other fluid systems such as jacketed piping, fittings, flanges, valves, etc. Therefore, to the extent that such applications of the invention are not expressly excluded from the appended claims, they are fully intended to be covered by those claims as are other applications of the invention such as those involving systems as disclosed in parent application No. 530,613 in which a primary containment and multiple enveloping containments are employed. Furthermore intended to be covered by the appended claim are applications of the principles disclosed herein to the identification of leaks in new, repaired, updated, and other systems before they are placed in operation.

The invention may be embodied in still other forms without departing from the spirit or essential characteristics of the invention. The present embodiments are therefore to be considered in all respects as illustrative and not restrictive, the scope of the invention being indicated by the appended claims rather than by the foregoing description. All changes which come within the meaning and range of equivalency of the claims are intended to be embraced therein.

What is claimed is:

1. A method of detecting leaks in a system comprising a primary containment for a substance with a fluid phase and a secondary containment enveloping the primary containment, said method comprising the steps of:

filling the space between the primary containment and the secondary containment with a non-corrosive, nontoxic, leak detection liquid which contains vegetable oil and citric acid in a minor amount effective to reduce the concentration of oxidation catalyzing metal ions in said liquid, said vegetable oil: (a) having a viscosity of not more than 100 centistokes at a temperature of −25° F., (b) being essentially stable over a temperature range of −25° to 140° F., and (c) being essentially chemically inert relative to the materials from which the primary and secondary containments are fabricated; and said method further comprising the step of monitoring a characteristic of or associatable with said leak detection liquid for a change indicative of a leak in at least one of said components.

2. A method of detecting leaks in a system comprising a primary containment for a substance with a fluid phase and a secondary containment enveloping the primary containment, said method comprising the steps of:

filling the space between the primary containment and the secondary containment with a non-corrosive, nontoxic, leak detection liquid which contains a vegetable oil and a nontoxic diluent in an amount effective to reduce the low temperature viscosity of the vegetable oil; said vegetable oil: (a) having a viscosity of not more than 100 centistokes at a temperature of −25° F., (b) being essentially stable over a temperature range of −25° to 140° F., and (c) being essentially chemically inert relative to the materials from which the primary and secondary containments are fabricated; and said method further comprising the step of monitoring a characteristic of or associatable with said liquid for a change indicative of a leak in at least one of said containments.

3. A method of detecting leaks as defined in claim 2 in which the diluent is an alcohol or a liquid petrolatum or other low viscosity mineral oil.

4. A method of detecting leaks as defined in claim 3 in which the vegetable oil is selected from the group consisting of palm oils and coconut oils.

* * * * *